Sept. 29, 1970 C. F. CHONG 3,531,658

BIT-SELECT MATRIX CIRCUIT SUITABLE FOR INTEGRATION

Filed March 6, 1967

INVENTOR
CARLOS F. CHONG

BY Rene A. Kuypers

ATTORNEY

United States Patent Office 3,531,658
Patented Sept. 29, 1970

3,531,658
BIT-SELECT MATRIX CIRCUIT SUITABLE FOR INTEGRATION

Carlos F. Chong, Norristown, Pa., assignor to Sperry Rand Corporation, New York, N.Y., a corporation of Delaware Filed Mar. 6, 1967, Ser. No. 627,244
Int. Cl. H03k *17/66, 17/72*
U.S. Cl. 307—248 12 Claims

ABSTRACT OF THE DISCLOSURE

The invention relates to a bit-sense matrix circuit which provides a low impedance path for switching purposes and a dual direction current amplification path for signal driving purposes. The circuit is further characterized in that the amplification elements are of the same type so that they are suitable for being integrated.

BACKGROUND OF THE INVENTION

The field of this invention is electronic circuitry in general and in more particular, the invention relates to a bit sense matrix selection circuit for use with computer memory elements.

This invention is related to patent application Ser. No. 375,522, filed June 16, 1964, and now U.S. Pat. No. 3,405,399.

Known prior art bit sense matrix selection circuits employed NPN and PNP transistors in combination and were not suitable for making integrated circuits in the monolithic form. Present day monolithic circuits are made by diffusing materials called "dopants" into a silicon substrate to thereby provide it with a P or N type characteristic. Since the diffusing step in the integrated fabrication is a very complicated step depending upon the solubility of the material, time, temperature, amount of diffusant, the depth of the diffusant, it is not readily possible to use both a P or N type dopant. Rather, for ease of fabrication, one or the other type dopants must be selected. The present invention solves this particular problem as will become hereinafter apparent.

In addition, prior art circuits employing an NPN and PNP transistor were characterized by a high offset voltage. The off-set voltage is defined as the emitter-to-collector voltage as they add a specified base current and no emitter current. The present invention virtually eliminates this problem in the subject circuit configuration.

SUMMARY OF INVENTION

The subject invention comprises a bit sense matrix selection circuit for use with a computer memory element which may be readily integrated in the monolithic form. The invention comprises two NPN transistors connected in series arrangement (collector-to-collector) or in the alternative the circuit may comprise a single dual emitter type transistor. The circuit may also be fabricated by utilizing two PNP transistors. Diodes, which are oppositely poled, are connected to one another as well as across the emitters of the circuit configuration. The transistors are in either form of the invention (i.e., when two transistors comprise a circuit or just one) the transistors are saturated in the inverted mode and thereby provide a low impedance circuit thereby providing a path between the load (that is a memory read out information signal), and a sense amplifier during a read cycle. The diodes connected across the emitter elements become conductive during the write cycle. Thus, one diode becomes conductive when a bit current is being conducted to the load in one direction and, the second diode becomes conductive when the bit current is conducted from the load in a second direction.

Accordingly, it is an object of this invention to provide a new and improved matrixing circuit.

It is yet another object of this invention to provide a new and improved bit sense matrixing circuit for use with a computer memory element.

It is another object of this invention to provide a new and improved bit sense matrix selection circuit which can be readily integrated in the monolithic form.

DESCRIPTION OF THE PREFERRED EMBODIMENTS

Figure 1:
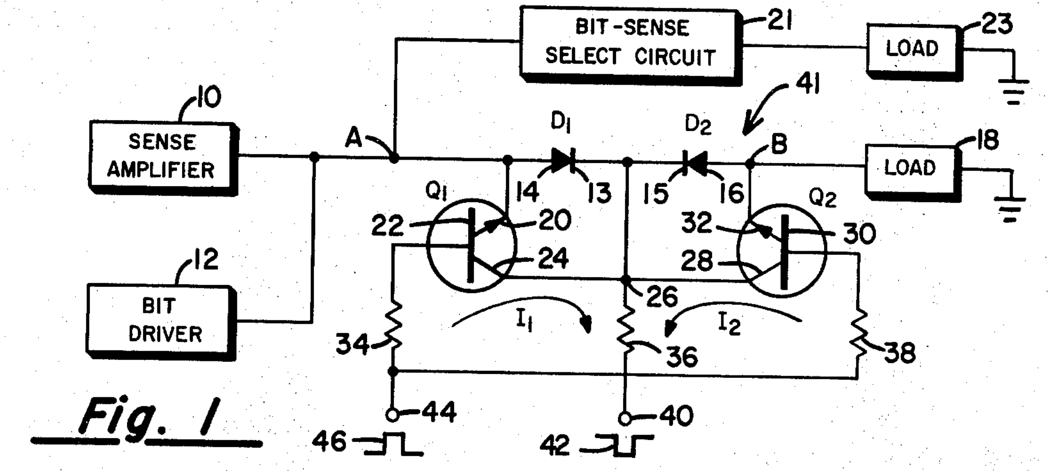
FIG. 1 comprises one of the circuit arrangements of the instant invention which utilizes two NPN transistors in series connection.

Referring now to FIG. 1 in greater detail, there is depicted a bit-sense select circuit 41 comprising two NPN transistors Q1 and Q2 which are connected to one another in series fashion. Thus, the collector 24 of transistor Q1 and the collector 28 of transistor Q2 are connected to one another. The emitter 32 is connected to the load 18 which may be a plated wire memory element, whereas the emitter 20 is connected both to the sense amplifier 10 and the bit driver 12. Connected across the emitter 20 and the collecor 24 is the diode element 14. Connected across the collector 28 and the emitter 32 is the diode element 16. The diode elements are connected to one another in such a fashion that their respective cathodes 13 and 15 are common-connected to the node point 26. The base elements 22 and 30 are common-connected through the respective resistors 34 and 38 to the terminal 44 which in turn is connected to the positive signal 46. In like manner, the negative signal 42 is applied to the terminal 40 which is common-connected to the collector elements 24 and 28 at the node 26 via the resistance element 36.

A plurality of bit sense matrix selection circuits may be arranged in parallel to one another as shown. Thus, the bit sense matrix selection circuit 21 may be connected to a common sense amplifier 10 and bit driver 12. The loads 18 and 23 which may be plated wire memory elements are operated in conjunction with word solenoids, which are not shown for the purpose of simplicity. Thus, the information at a bit position along one plated wire at a time may have information read out or recorded thereon in conjunction with the operation of its associated bit sense matrix selection circuit, as well as the common sense amplifier and the common bit driver. The discusion hereinafter will be limited to the load 18 and its associated bit sense matrix selection circuit.

The circuit of FIG. 1 will be discussed in regard to two modes of operation, namely, a read and record mode for the load or memory element 18. For a memory read mode of operation, the transistors Q1 and Q2 are saturated in the inverted mode by applying the pulse 46 to the terminal 44 simultaneously with the application of the pulse 42 to the terminal 40. By energizing the transistors Q1 and Q2 in the inverted mode, the current I1 flows from terminal 44 to terminal 40 via the resistors 34 and 36 and the base element 22 and the collector element 24. In like manner, current I2 flows from the terminal 44 to the terminal 40 via the resistors 38 and 36, as well as the base element 30 and the collector element 28. This manner of energizing the transistors Q1 and Q2 is considered to be in the inverted mode, since normally the currents I1 and I2 respectively flow through the base 22 to the emitter 20 as well as through the base 30 and the emitter 32.

Figure 2:
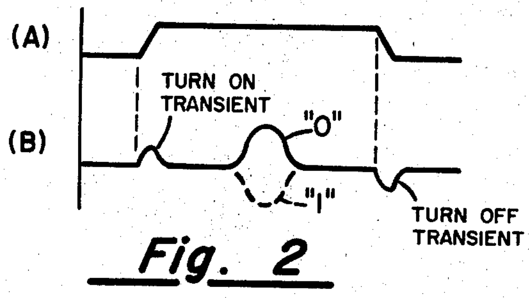
FIG. 2 comprises the binary read out signals obtained by the energizing of circuit of FIG. 1.

Simultaneously with the energizing of transistors Q1 and Q2 by means of signals 42 and 46, the solenoid (not shown) associated with the plated wire load 18 is energized. The energizing of the plated wire load 18 causes a signal to be induced which is either positive or negative depending upon whether a binary 0 or a binary 1 is stored in the memory. The signal is shown in FIG. 2B.

When the transistors Q1 and Q2 are energized in the inverted mode as above described, they provide a low impedance switch which connects the sense amplifier 10 and the plated wire 18. Thus, the induced signal representing a binary 0 or a binary 1 is transmitted via the switch to the sense amplifier 10. The low impedance characteristics of the transistors Q1 and Q2 can be demonstrated graphically by referring to the $I_E$ versus $V_{EC}$ characteristic shown in FIG. 3 for an NPN transistor. Since transistors Q1 and Q2 are both of the NPN type and since both curves would be substantially the same, only a single curve is shown in the figure. This curve represents a typical forward and inverted gain characteristic of an NPN transistor for the same base current $I_E$. The saturation resistance of the transistors Q1 and Q2 can be readily obtained by determining the slope $(V_E/I_E)$ in the operating range thereof. It can be readily seen by referring to FIG. 3 that the impedance of an NPN transistor operated in the inverted mode is of small magnitude, since for a large increase in current there is a corresponding small increase in voltage. Accordingly, the impedance is of relatively small magnitude. Since there are two NPN transistors connected in a series arrangement the impedance is twice the value obtained for a single transistor.

Figure 3:
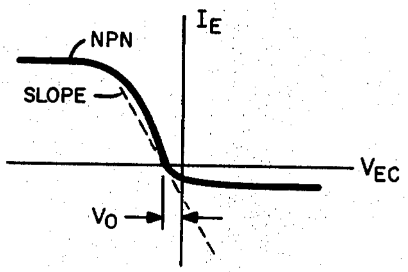
FIG. 3 comprises a typical $I_E$ versus $V_{EC}$ characteristic curve for the NPN transistor used in a circuit of FIG. 1.

The intercept of the typical forward and inverted gain characteristic curve shown in FIG. 3 intercepts the $V_{EC}$ coordinate at a point slightly removed from the origin. The value of the X intercept or the value of $V_{EC}$ (typically .5 to 2 millivolts) is called the transistor offset voltage. The offset voltage $V_O$ is defined as the emitter to collector voltage at a specified base current and no emitter current.

Figure 4:
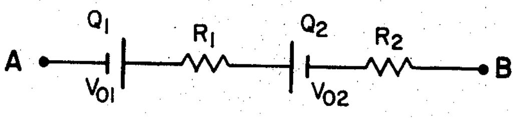
FIG. 4 comprises the small signal equivalent circuit of the embodiment shown in FIG. 1.

The relationship of the offset voltages of transistors Q1 and Q2 may be more readily appreciated by referring to the equivalent circuit shown in FIG. 4. Thus, the offset voltage of transistor Q1 is represented by the battery $V_{01}$ and the offset voltage of transistor Q2 as shown by the battery $V_{02}$. The impedance of the transistors Q1 and Q2 operating in the inverted mode are designated respectively by the resistors R1 and R2. The terminals A and B correspond to the terminals A and B of the bit sense circuit 41 shown in FIG. 1. The offset voltages $V_{01}$ and $V_{02}$ are shown as being connected in opposition to one another. This is the result of the fact that transistors Q1 and Q2 in FIG. 1 are connected in opposition to one another (that is, the collectors 24 and 28 are connected to one another as opposed to the collector 24 being connected to the emitter 32). This is an important aspect of the subject invention in view of the fact that the offset voltages $V_{01}$ and $V_{02}$ substantially cancel each other and hence, the net offset voltage is approximately 0. Accordingly, the induced voltages shown in FIG. 2 (that is the voltage designating a binary 0 and a binary1) are detected readily since good discrimination (i.e. good signal to noise ratio) is obtained between the induced signal and the offset voltage. In other words, the smaller the offset voltage the better is the discrimination to detect a binary 0 or 1 signal shown in FIG. 2, since where the offset voltage is high, the signal which is superimposed thereon will not be readily distinguishable therefrom. It should be noted that the impedance of the circuit shown in FIG. 1 when operated in the inverted mode is represented by the combined resistors R1 and R2 and is relatively of low order.

In operation, when information is read out of the memory element 18, the binary 1 or binary 0 signal is transmitted from node B to node A via the bit sense matrix selection circuit 41 to the sense amplifier 10. The sense amplifier 10 determines whether the signal stored in the load 18 is a binary 0 or a binary 1. Thus, the circuit of FIG. 1 may be readily used in a computer device operating in a read mode. The circuit of FIG. 1 also serves to transmit current in a first or second direction from the bit driver 12 to the load 18 for a memory write mode as will be explained below.

Information is written into a plated wire memory device by energizing an associated word solenoid (not shown) and in substantial coincidence therewith, a signal is applied in a first or second direction down the wire. In other words, when the current is applied down the wire in one direction in conjunction with the energized word solenoid the magnetization vectors of the continuous magnetic coating of the wire become oriented in one circumferential direction, whereas if current is directed down the wire in a second direction, the magnetization vectors become oriented in an opposite circumferential direction. The direction of the magnetization vectors in the circumferential direction determine whether a binary 0 or a binary 1 is stored at a particular bit position. From the above it should be apparent that if the bit sense select circuit 41 is to operate in the write or record mode, current must be provided to the load 18 (i.e., the plated wire memory element) in the two directions discussed above via the bit sense matrix selection circuit. This is accomplished in the following manner.

Let us assume that current is to be passed through the load 18 in a downward direction (from node A to node B). Accordingly, transistors Q1 and Q2 are first biased by applying the positive signal 46 to terminal 44 and the negative signal 42 to terminal 40. Simultaneously with the forward-biasing of transistors Q1 and Q2, the bit driver 12 is energized. Since current is to flow from node A to node B the bit driver 12 produces a positive signal. This positive signal which appears at node A is also applied to the anode 14 of diode D1. The cathode 13 of diode D1 which is connected to the node 26 and in turn to the terminal 40 by means of resistor 36 is at some potential less than ground. Hence, diode D1 becomes forward biased and node 26 becomes positive. Transistor Q2 becomes forward biased since the positive signal 46 has been applied to the base 30 and the collector 28 (which is connected to node 26) is positive with respect to the emitter 32 which is at ground because it is connected to node B. On the other hand, transistor Q1 is back biased since the emitter 20 is positive with respect to the collector 24 since diode D1 is forward biased. D2 is back biased since the forward biasing of transistor Q2 causes cathode 15 to be more positive than anode 16. Accordingly, since diode D1 and transistor Q2 are forward biased, main current flow is conducted from the bit driver 12 to the node A, through the diode D1 in a direction from the anode 14 to the cathode 13, and then to the node 26. The main current also flows from node 26 through the transistor Q2 to node B and through load 18 via collector 28 and emitter 32. Hence, current flows in a downward direction through the load 18. A portion of the main current flowing into the node 26 flows through the resistor 36 to terminal 40. The current I1 continues to flow from terminal 44 to terminal 40 via the base 22 and the collector 24 of transistor Q1. The current I2 opposes the main current flowing from node 26 through the transistor Q2 and since it is smaller than this current, it effectively subtracts therefrom. A small amount of current also flows through the base 30 and the emitter 32 to node B and thence to the load 18 to ground.

In like manner, the circuit of FIG. 1 permits current to flow through the load 18 in an upward direction (i.e., from node B to node A). This is accomplished in the same manner as above described. Thus, bit driver 12 produces a negative signal which is applied to the node A and in turn is applied to anode 14. The negative signal 42 is applied to terminal 40 and to node 26 via resistor 36. Diode D2 becomes forward biased since the anode 16 is connected to node B which is slightly below ground potential whereas cathode 15 is negative because it is connected to node 26 which is negative. Node 26 is negative. Transistor Q1 is forward biased since a positive signal 46 is applied thereto via terminal 44 and resistor 34. Also, the emitter 20 is negative (i.e., a negative signal is applied to node A by bit driver 12) with respect to the collector 24 (i.e., node 26 is slightly below ground due to current flow through diode D2). Accordingly, main current flows in the upward direction from ground through the load 18 to node B, through the anode 16 and the cathode 15 of the diode D2 to the node 26. The main current flows from node 26 through the collector 24 to the emitter 20 and thence to node A and to the bit driver 12. No current flows through diode D1 because it is back biased by the current flow through transistor Q1. In other words, the cathode 13 is slightly more positive than the anode 14. The current I1 subtracts from the main current from node 26 that flows through the emitter 20 and collector junctions 24 of transistor Q1. Current which passes through the diode D2 to the node 26 likewise passes a portion thereof through the resistor 36 to the terminal 40 at the same time that the current I2 flows therethrough. A small amount of current also flows through the base 22 and emitter 20 of transistor Q1 since the emitter is negative with respect to the base. No current flows through the transistor Q2 since it is not forward biased due to the forward biasing of the diode D2 which effectively makes the emitter 32 more positive than the collector 28.

The bit sense select circuit 21 operates in the same manner as circuit 41. Thus, a record or sensing mode can be provided for any memory element such as 18 and 23 through the energizing of the associated bit sense matrix circuit by means of the signals similar to signals 42 and 46. The single sense amplifier 10 serves a plurality of such memory elements although only one element is read out or recorded in at a time. The bit driver 12 provides current in either one of two directions to any one of the several memory elements.

Figure 5:
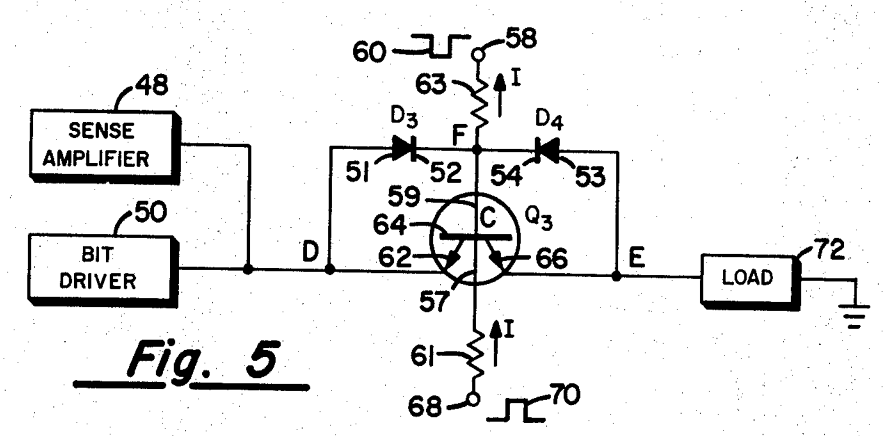
FIG. 5 comprises another embodiment of the instant invention utilizing the dual emitter type NPN transistor.

Turning now to FIG. 5, there is depicted another embodiment of the instant invention. The circuit depicted replaces the two NPN transistors Q1 and Q2 of FIG. 1 with a single dual emitter transistor. The circuit of FIG. 5 overcomes previously known bit sense matrix select circuit shortcomings which use bilateral transistors. Thus, in previously known circuits, the two junction elements of the bilateral transistor act as both an emitter and a collector, since current flows through the junction elements in either direction. This normally results in low current gain and slow speed since the junction elements are made of the same physical size. This is contrary to a normal transistor element wherein the collector has a larger physical size than the emitter. The circuit of FIG. 5 overcomes the above-described shortcomings. Furthermore, FIG. 5 operates in the identical manner of that of FIG. 1.

In the read mode of operation the signals 60 and 70 are applied respectively to the terminals 58 and 68. Simultaneously, a word strap (not shown) which is juxtaposed to the load 72 (i.e., plated wire element) is energized. The applying of the signals 60 and 70 to the bit sense matrix select circuit causes the current to flow from terminal 68 to 58 via the resistors 61 and 63, as well as the base 57 and the collector 59. The current entering the base junction 57 is approximately the same as the current leaving the collector junction 59. As described above the current flowing in the manner above described causes the transistor Q3 to become a low impedance device. Accordingly, a signal read out of the load 72 which is either a binary 0 or a binary 1 is transmitted to the sense amplifier 48 via transistor Q3.

The offset voltage of the circuit shown in FIG. 5 is of a low order of magnitude. This results from the fact that the dual emitter transistor Q3 actually comprises two NPN transistors connected in opposition to one another. Since the dual emitter transistor Q3 has an equivalent circuit like that of FIG. 1 (that is, the collector is common to both emitters 62 and 66 so that the emitter to base junctions are opposed to one another) the offset voltage is substantially zero. On the other hand, since the transistor Q3 comprises two transistors, the total resistance is twice that of a single transistor element.

In any event that the circuit of FIG. 5 is to be used in the record or write mode to supply current to the load 72 in one of two directions, the signals 60 and 70 are again applied to the terminals 58 and 68, respectively. Assuming that current is to flow in the load 72 in the downward direction to ground (that is from node D to node E), bit driver 50 supplies a positive signal. This positive signal from the bit driver 50 is applied to node D and in turn to the anode 51 of the diode D3. The negative signal applied to terminal 58 and to node F causes diode D3 to become forward biased.

The junction comprising the base 57 and the emitter 66 is forward biased since the positive signal 70 is applied to terminal 68 and the emitter 66 is connected to node E which is at ground potential. Furthermore, the collector 59 is positive since node F is positive. Accordingly, current flows from the bit driver 50 through the anode 51 and the cathode 52 of the diode D3 to node F, through the collector 59 and the emitter 66 to node E and thence to ground via the load 72. The junction comprising collector 62 and the collector 59 is back biased since current flowing through diode D3 causes the collector 59 to be negative with respect to emitter 62. Diode D4 is back biased since the current flow through the collector 64 and the emitter 66 causes the cathode 54 to be positive with respect to anode 53.

Current can be made to flow in the upward direction through load 72 (that is, from node E to node D) by having the bit driver 50 apply a negative signal to node D. Accordingly, diode D4 becomes forward biased since node E which is connected to the anode 53 is at ground potential whereas the cathode 54 is connected to node F which is in turn connected to the negative signal 60 via resistor 63. The junction of the dual emitter transistor Q3 comrising emitter 62 and collector 59 is forward biased since the emitter has a negative signal applied thereto via the bit driver 50 and node D, whereas the collector 59 is slightly below ground due to the current flow through diode D4. Also, the base 57 is positive due to the signal 70 being applied to terminal 68 with respect to the emitter 62. Accordingly, current flows to the load from ground in an upward direction through the load 72 to the node E and thence through the diode D4 from the anode 53 to the cathode 54 to the node F. Current then flows from node F through the collector 59 and the emitter 62 to the node D and thence to the bit driver 50. Current also flows from node F to the terminal 58 via resistor 63.

The junction comprising collector 64 and emitter 66 is back biased since the current flow through diode D4 causes emitter to be more positive than the collector. The diode D3 is back biased since the current flow through the collector 59 and the emitter 62 causes the anode 51 to be slightly negative with respect to the cathode 52.

It is therefore apparent that FIG. 5 operates in a manner similar to FIG. 1 in that it provides a low impedance switching circuit with a low offset voltage for a signal read out of the memory load 72. In addition, current can be provided to the load 72 in either one of two directions to provide a steering current to enable a binary 0 or a binary 1 to be recorded therein.

The embodiments of the invention in which an exclusive property or privilege is claimed are defined as follows:

1. An electrical circuit comprising
   (a) first and second transistor devices, said devices being connected to one another in series;

(b) means connected said first transistor device for conducting current in a first direction;

(c) means connected across said second transistor device for conducting current in a second direction;

(d) means connected to said first and second transistors for operating said transistors in an inverted first mode, said operation in the inverted mode placing said first and second transistors in a low impedance state for switching;

(e) means further connected to said first and second transistors and to said means connected across said first and second transistors for directing current in a second mode of operation through said first transistor and said means connected across said second transistor, and in an alternative a third mode of operation for directing current through said second transistor and said means connected across said first transistor, said currents flowing in said second and third modes being amplified through said circuit paths.

2. An electrical circuit in accordance with claim 1 wherein said means further connected comprises a load which is connected to the output of said second transistor device, and a sense amplifier and bit driver which are both connected to the input of said first transistor device.

3. An electrical circuit in accordance with claim 2 wherein said load comprises a binary storage element.

4. An electrical circuit in accordance with claim 1 wherein said first and second transistor devices comprise NPN transistors, each having an emitter, base and collector element, said transistor being series connected by means of their respective collectors.

5. An electrical circuit in accordance with claim 1 wherein said first and second transistor comprise PNP transistors.

6. An electrical circuit in accordance with claim 4 wherein a positive signal is applied to the base elements and a negative signal is applied to the collector elements of said NPN transistors for placing said devices in an inverted mode of operation.

7. An electrical circuit in accordance with claim 3 wherein the applying of a current from said bit driver in conjunction with the applying of said energizing signal to the base collector junction enables current to be conducted to the load in a first or second direction in accordance with said second and third mode of operation.

8. An electrical circuit comprising:

(a) a current conducting device having two output elements, one control element and one input element;

(b) means connected across said input element and one of said output elements for conducting current in a first direction;

(c) means connected across said input element and said other output element for conducting current in a second direction;

(d) means connected to said control and said input element for operating said device in an inverted first mode of operation, said operation in the inverted mode placing said device in a low impedance state for switching;

(e) means further connected to said device and to said means connected across said input elements for directing current in a second mode of operation through one said output element and said means conducting current in a second direction;

and in an alternative third mode of operation, for directing current through the other said output element and said means conducting current in a first direction, said currents flowing in said second and third modes of operation being amplified through said circuit paths.

9. An electrical circuit in accordance with claim 8 wherein said current conducting device comprises a dual emitter transistor element.

10. An electrical circuit in accordance with claim 9 wherein said means for conducting current in a first and a second direction comprises a diode.

11. An electrical circuit comprising, (a) semiconductor means, (b) means connected to said semiconductor means for conducting current in a first direction, (c) means connected to said semiconductor means for conducting current in a second direction, said means for conducting current in said first and second direction being connected in opposition to one another, (d) means connected to said device for operating said semiconductor means in an inverted first mode, said operation in the inverted mode placing said semiconductor means in a low impedance state for switching;

(e) means further connected to said semiconductor means and to said means for conducting current in a first and second direction for directing current in a second mode of operation through said semiconductor means and said means for conducting current in a second direction;

and in an alternative third mode of operation, for directing current through said semiconductor and said means conducting current in a first direction, said currents flowing in said second and third modes of operation being amplified through said circuit paths.

12. The combination in accordance with claim 11 wherein a sense amplifier and a bit current driver are connected to one side of said semiconductor means and a load is connected to the other side thereof.

References Cited

UNITED STATES PATENTS

| | | | |
|---|---|---|---|
| 2,962,603 | 11/1960 | Bright | 307—254 |
| 3,119,064 | 1/1964 | Aillis | 307—254 X |
| 3,231,763 | 1/1966 | Mellott | 307—238 |

OTHER REFERENCES

Mitchell et al., "The Inch," Solid State Design, October 1962, pp. 34–42.

JOHN S. HEYMAN, Primary Examiner

U.S. Cl. X.R.

307—242, 249, 254